July 16, 1940.  M. KORACH ET AL  2,208,034
GLASSY SHAPES AND METHOD OF PRODUCING SAME
Filed May 29, 1936
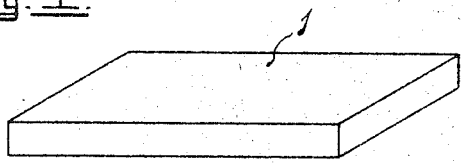
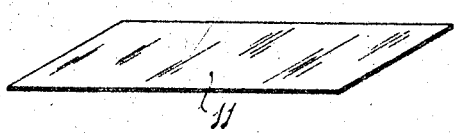
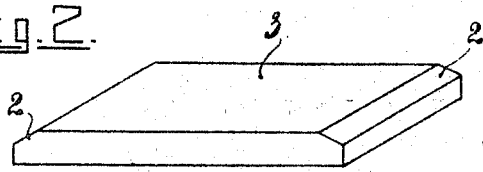
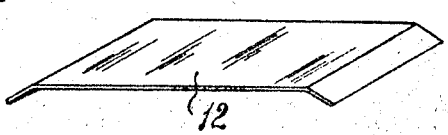
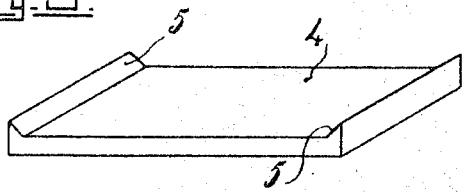
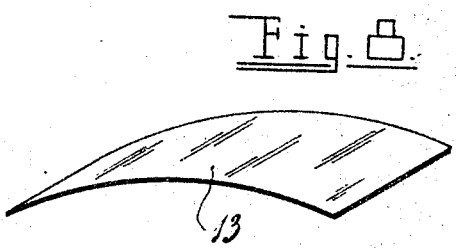
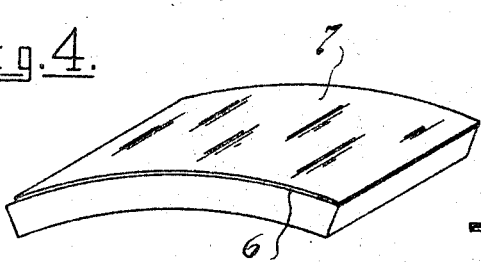
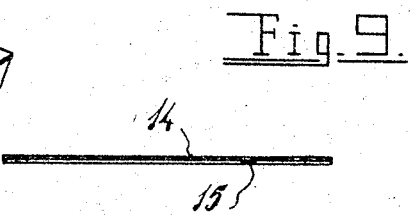
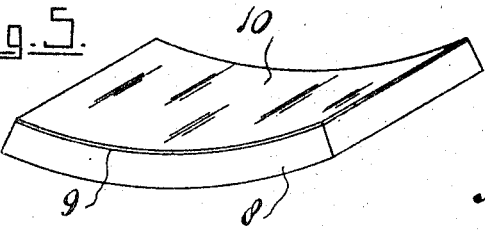
Inventors
Maurizio Korach & Antonino
Dal Borgo
by
Kach Michaelis
Atty Patented July 16, 1940

2,208,034

UNITED STATES PATENT OFFICE 2,208,034

GLASSY SHAPES AND METHOD OF PRODUCING SAME

Maurizio Korach, Bologna, and Antonino Dal Borgo, Veggia, Italy

Application May 29, 1936, Serial No. 82,558
In Italy June 12, 1935

17 Claims. (Cl. 49—77)

Our invention relates to a process of manufacture of shaped articles and more especially plates or tiles of plane or curved or arched configuration from fusible constituents such as have hitherto been used in the production of glass, glazes, enamels or the like, including silicates, phosphates, borates, alumina and the oxides of alkali and alkaline earth and earth metals.

It is an object of our invention to manufacture tiles, plates and other bodies having a glassy character in a novel and particularly simple and inexpensive manner.

It is a further object of our invention to produce from the constituents, mentioned above, of glass-, glaze- or enamel-like materials a number of articles presenting properties which have not been obtained when proceeding according to the manner hitherto adopted in the manufacture of glass, glazes or enamels. Our invention therefore relates also to the novel products obtainable according to the process which shall be disclosed in detail hereinafter and we wish to emphasize the fact that these products are distinguished from the plates, tiles or other bodies obtainable from glass constituents by proceeding in the way hitherto adopted for this purpose, the new products possessing valuable properties, which were hitherto not obtainable.

In the process of producing glass, glazes or enamels, as ordinarily practised, the batch containing the constituents to be fused together is heated to and above fusion temperature. The fused mixture is then heated further to clear it from still unfused particles, to expel included air, etc., and the cleared melt is then shaped by molding it in a mold.

In contrast to this mode of producing glass we proceed in a manner similar to that customary in the art of producing ceramic products, wherein the bodies to be obtained are molded from the pulverulent batch, which is then fired. In this process of production of ceramic articles no clarifying of the heated batch is included.

In proceeding in a similar manner when producing the new articles obtainable according to our invention, we have succeeded in producing glass-like bodies of particularly valuable properties which render them particularly useful as wall coverings and for similar purposes.

The ceramic articles, such as white ware and stone ware tiles, hitherto employed for wall covering involve the drawback of a comparatively high weight due to the thickness of the tiles. Apart therefrom the glazes coating this ware are objectionable in that after a comparatively short time hair cracks develop in all such glazes due to the tension existing between the glaze and the white or stone ware body. Obviously these cracks greatly impair the outer appearance and other qualities of the tiles. To produce curved or arched tiles and corner pieces by ceramic methods has proved to be particularly difficult. The size of ceramic products is greatly limited, since the production of large tiles or plates is particularly difficult and expensive.

For all these reasons one has repeatedly tried to replace the ceramic tiles by glass plates produced according to the well known methods of plate glass manufacture. While such plates can be produced in large sizes and do not involve the danger of hair crack formation, their price is higher than that of ceramic tiles and they further involve the drawback of being fixable in place on the wall only with difficulty, since the cement or mortar used as a binder will not firmly adhere to the glass surface. We may add that the processes of manufacture hitherto used in the production of tiles are time consuming and require large and costly installations.

The process according to our invention avoids all these drawbacks in a particularly simple manner, while combining all the advantages of the ceramic methods with the favorable properties of glasses. The installation required for operating this process is of a simple and little expensive character.

The new process substantially consists therein, that on a support serving as a mold, which need however not be formed with a depression or cavity, but may be plane or may even form or be formed with one or a plurality of projections, is deposited, in the manner hitherto adopted with glazes, a batch in the form of a powder or a suspension of such in a suitable liquid, constituted similarly as the well known or hitherto unknown glasses, glazes or enamels. The support with the pulverulent batch deposited thereon is now heated to a temperature, whereby the batch is fused to form a thickly fluid mass which closely adapts itself to the surface of the support serving as a mold. It is an important feature of our invention that the process is so conducted that the fused layer will detach itself, or can be detached, after solidification, from the supporting mold either in one or, if desired, in a plurality of pieces, whereupon the supporting mold can be reused for the shaping or molding of further molded shapes of the same kind.

In order to operate the new process, we prefer to first shape the support or mold from a ceramic mass, without however being limited to ceramic supports or molds.

The support thus formed is fired in the usual manner at a temperature, as a rule ranging between 600 and 1650° C., corresponding to its composition. Preferably this firing temperature of the support shall be higher than the maximum temperature required for melting down the batch of glass, glazing or enamel to be thereafter deposited on the support.

The support, before being put to use as a mold, is subjected, before or after firing, to a mechanical treatment by machining or otherwise, whereby it is imparted the accurate shape required to thereafter produce, from the pulverulent batch to be fused thereon, shaped articles of absolutely uniform size and configuration.

On the support thus produced we first deposit a layer of a material adapted to remain loose and refractory during the subsequent firing of the glass-like batch.

This intermediate layer acting after the manner of a slip or engobe may be constituted of one or a plurality of inorganic materials, such as ground quartz, calcium oxide, magnesium oxide, hydrate or anhydrid of alumina, sillimanite, zirconium sand and the like. In a preferred form of our invention the constituents of this intermediate layer or engobe shall not, or substantially not, enter into combination, during the final firing, with the material constituting the support or mold and shall neither fuse nor sinter together with the surface of the support.

On this intermediate layer serving as a supporting layer we now deposit, preferably in a uniform manner, the batch serving to form the glass-like body to be produced, and we then heat the support with the intermediate layer and the batch in the usual manner, the maximum temperature to be reached in thus heating the articles depending upon the composition of the glass, glaze or enamel formed when fusing the batch. Since the constitution of the material forming the support and the supporting layer can be selected according to requirements, we are enabled to fuse down according to our new process all known batches of glasses, glazings or enamels.

During or after the firing the fused layer will detach itself or can be detached from the support without any difficulty, free from cracks, and we thus obtain plate-shaped bodies, which substantially consist only of the fused and solidified mass presenting an altogether smooth or, if desired, mat surface, while its underside, due to a more or less great proportion of the separating or intermediate layer adhering to it, is uniformly rough, so that it will lend itself to a ready and solid connection with the wall or with some other surface by cementing or the like.

After the layer solidified from the fused stage has been detached, the support serving as a mold may at once be reused in the production of another plate or other shaped glass body of the same shape and configuration. In the practice of our invention we have found that ceramic supports or molds of the kind described will withstand more than 200 firings and we are therefore enabled to produce large quantities of glass bodies with the aid of a comparatively small number of molds, whereby our process is advantageously distinguished from the processes hitherto used in the production of white or stone ware tiles. Obviously the shape, dimensions and other properties of plate-shaped glass bodies to be produced are limited only by the size and shape of the mold supports. Since these molds can be produced with great accuracy, the glass bodies produced therein will possess a practically perfect uniformity of shape, size and configuration and we are nevertheless enabled to produce shapes of very low thickness, a result, which has been found greatly desirable, but in many cases impossible in the production of ceramic tiles.

The products of our process will detach themselves from their molding support free from all cracks. If the support is subdivided to form a plurality of juxtaposed molds, the solidified glassy layer may be obtained in a plurality of separate pieces.

We may further the separating of the glassy layer from the support, after the firing, even in the absence of a separating intermediate layer, by so choosing the composition of the support on the one hand and the glass batch on the other hand, that they possess different heat expansion coefficients.

By correspondingly choosing the composition of the intermediate or separating layer on the one hand and of the batch designed to form the glassy layer, we may provide that this latter layer, when detaching itself from the support, will also detach itself to a great extent or practically completely from the intermediate layer. We may however also provide that the intermediate or separating layer sticks to the glassy layer, while being detached from the support.

If it is desired that the intermediate layer stick to the glassy layer while detaching itself from the support, we may for instance form this intermediate layer with greater thickness, as a so-called engobe layer, which is firmly connected, after firing, with the glassy layer, forming with this latter a plate or other ceramic body of comparatively great thickness. In such a case we have found it preferable to arrange between the engobe layer proper and the support or mold a separating layer of the kind above described, whereby the detaching of the combined engobe layer and glassy layer from the support is facilitated.

When said separating layer and engobe layer, respectively, are caused to stick to the glassy layer as intimately as is brought about by the common firing, an article is obtained the glassy front part of which changes gradually into the rough underside mentioned above, in contrast to known glass plates or tiles to which grains of refractory or similar materials are attached by means of binding agents, such as varnish or plaster of Paris or water-glass. These known plates with the so attached grains, even if heated to the temperatures at which colors are burned in their front surface, do not show the gradual change of the glassy front part into the ceramic rear side displayed by our new plates if produced according to the processes above specified, nor is such gradual change obtained by pouring in accordance with a known process fused glass in a mould which is covered for instance with hot sand.

The support or mold as such, instead of consisting of a fired ceramic mass and a separating layer, may also be formed, in a manner well known per se, from a mixture of materials corresponding to the constitution of such separating layers. Also in this case the surface of the support or mold must be formed exactly in correspondence with the final shape of the fused body to be produced. The special batch serving for the preparation of a support or mold, which acts as such as a separating body, must retain its shape during the final firing and the particles constituting same shall not coalesce, for instance by sintering, in order to obtain that after the firing the support will crumble down under a slight mechanical action or can be reduced to powder by rubbing or the like. This powder may then be used directly in the formation of a new support, a binder being added, if desired. The batch used in the produtcion of this kind of support will be constituted substantially like the batch serving for forming the separating layer, consisting for instance of hydrate or anhydrid of alumina, of fused alumina, quartz sand, ground quartzite, sillimanite, mullite, magnesite, zirconium sand or the like, to which may be added, according to grain size, purity or other physical properties of these raw materials or mixtures of same and depending upon the temperatures of firing to be used in each individual case, inorganic binders, such as clay, kaoline, steatite, bentonite, etc., and/or organic binders, such as dextrine, etc., may be added, care being always taken to provide that after the final firing the mass must remain loose and incompact, being reducible to a powder by slight mechanical action.

Obviously it is not imperative that the support or mold consist of a ceramic or other metalloid refractory material, but a suitable support or mold may also be formed of a metal unaffected by the maximum firing temperature.

Since the glass plates or other shapes produced according to this invention, which substantially consist only of the body solidified from the fused state, to which may adhere part of the separating or engobe layer, are as a rule very thin, it may be advantageous, in order to simplify and safeguard the transport or use of these bodies, to reinforce them by depositing thereon, by spraying, casting or otherwise, a layer of putty, cement, mortar or the like.

In the drawing affixed to this specification and forming part thereof, some forms of supports or molds to be used and some articles formed in the process according to this invention are illustrated by way of example in a purely diagrammatic manner.

In the drawing

Fig. 1 illustrates a plate-shape support or mold 1 of rectangular cross section, while Fig. 2 shows a support with bevelled edges 2 enclosing between them a plane surface 3.

Fig. 3 illustrates a support formed with a depression, the bottom 4 of which is bordered by sloping side walls 5.

Fig. 4 illustrates a support of arched configuration, the curved upper surface 6 of which is relied upon to support and mold the glassy layer 7 constituting, on being subsequently detached from the support, the final product of the process.

Fig. 5 illustrates a support 8 curved to form a concave molding surface 9, on which is deposited the glassy layer 10.

Fig. 6 illustrates by way of example a thin plate 11 of glass-like material produced for instance on the support of Fig. 1.

Fig. 7 shows a corner plate 12 such as produced on the molding support of Fig. 2, or, in inverted position, on the support of Fig. 3.

Fig. 8 shows a curved glass-like body 13 as obtainable with the aid of the molding supports of Fig. 4 or 5.

Fig. 9 illustrates a composite shape, 14 being a glass-like layer, while 15 is an engobe layer or a layer of cement fixed to it.

Obviously the degree of fluidity of the fused batch used in this and in most other cases should be such as to prevent the fused mass from flowing off the molding surface.

In order to illustrate more in detail the manner in which our invention can be practised, we are now going to cite a number of examples of batches to be used in the production of the supports or molds, the separating or engobe layers and the glass-like layers designed to form the final products, together with the firing temperatures to be employed in each individual case.

I

*Composition and firing temperatures of molding supports*

Example 1.—Dry ground and sifted clay from Sassuolo (Italy); firing temperature about 950° C.

Example 2.—Elutriated clay from Velten near Berlin (Germany); firing temperature about 950° C.

Example 3.—A mixture of 30% clay from Wildstein, Germany, containing 38 to 40% $Al_2O_3$ and 70% of burnt and ground sillimanite; firing temperature 1280 to 1300° C.

Example 4.—A mixture of 20% clay from Wildstein, containing 38 to 40% $Al_2O_3$, and 80% anhydrid of alumina; firing temperature 1350 to 1500° C.

Example 5.—A mixture of 70% Stourbridge fireclay and 30% calcined Stourbridge fireclay; firing temperature 1280 to 1300° C.

Example 6.—A mixture of 40 Scotch fireclay and 60% Sotch fireclay-grog; firing temperature 1300 to 1350° C.

Example 7.—A mixture of 42% clay substance, 50% quartz and 8% feldspar; firing temperature 1200 to 1250° C.

II

*Composition of engobe and separating layers*

Example 8.—A mixture of 15% kaoline from Zettlitz, Germany, and 85% alumina.

Example 9.—A mixture of 33.3% kaoline from Kanig, Germany, "0000," and 66.7% hydrate of alumina.

Example 10.—A mixture of 18% kaoline from Florida, 22% Indian sillimanite and 60% anhydrid of alumina.

Example 11.—A mixture of 30% English China clay (St. Austell) and 70% fused and finely ground magnesia.

Example 12.—A mixture of 20% English Ball clay from Dorset and 80% Dolomite.

Example 13.—A mixture of 1.5% bentonite and 98.5% alumina.

III

*Composition and firing temperatures of glasses, glazes, enamels and the like*

Example 14.—For a firing temperature of 900 to 920° C.:

0.50 PbO
0.10 BaO
0.15 (Ca, Mg)O
0.25 (K, Na)O 0.23 $Al_2O_3$ 3.50 $SiO_2$
0.40 $SnO_2$
0.22 $B_2O_3$

*Example 15.*—For a firing temperature of 900 to 920° C.:

- 0.40 PbO
- 0.10 BaO
- 0.25 (Ca, Mg)O
- 0.25 (K, Na)O
- 0.23 $Al_2O_3$
- 3.50 $SiO_2$
- 0.22 $B_2O_3$

*Example 16.*—For a firing temperature of 950 to 1000° C.:

- 0.40 PbO
- 0.25 MgO
- 0.10 BaO
- 0.25 (K, Na)O
- 0.30 $Al_2O_3$
- 3.0 $SiO_2$
- 0.5 $TiO_2$
- 0.4 $SnO_2$
- 0.4 $B_2O_3$

*Example 17.*—For a firing temperature of 1040 to 1060° C.:

- 0.25 BaO
- 0.45 (Ca, Mg)O
- 0.30 (K, Na)O
- 0.20 $Al_2O_3$
- 4.00 $SiO_2$
- 0.10 $B_2O_3$

*Example 18.*—For a firing temperature of 1230 to 1280° C.:

- 0.1 MgO
- 0.7 CaO
- 0.2 $K_2O$
- 0.4 $Al_2O_3$
- 3.5 $SiO_2$

*Example 19.*—For a firing temperature of 1280 to 1320° C.:

- 0.5 $K_2O$
- 0.5 MgO
- 0.5 $Al_2O_3$
- 3.67 $SiO_2$

*Example 20.*—For a firing temperature of 1400 to 1420° C.:

- 0.7 CaO
- 0.3 $K_2O$
- 0.8 $Al_2O_3$
- 7.0 $SiO_2$

*Example 21.*—For a firing temperature of 1450 to 1500° C.:

- 0.8 CaO
- 0.2 $K_2O$
- 1.2 $Al_2O_3$
- 10.0 $SiO_2$

Obviously the examples here given for the constitution of glasses, glazes, enamels and the like may be completed in the usual manner by the addition of coloring matter in order to obtain colored final products.

The plates or other bodies obtained according to this invention are distinguished, amongst other things, from similar plate glass articles by the feature that their back-side is always rough. In the claims the term "glass" is meant to include masses having the character of a glass, glaze or enamel.

Various changes may be made in the details disclosed in the foregoing specification without departing from the invention or sacrificing the advantages thereof.

We claim:

1. The method of producing thin plates from materials forming, when fused and solidified from the fused state, glass-, glaze- or enamel-like masses, which comprises depositing on a molding support capable of withstanding the melting and firing temperature, a batch of fusible material of the kind above described, the constitution of the batch to be deposited on the support being so chosen that the layer solidified from the fused state can readily be detached from the said support, heating the support together with the batch deposited thereon, to effect fusion of the batch and detaching, from the said support, the layer formed by fusing.

2. The method of claim 1, in which a separating layer is deposited on the surface of the molding support, before the batch of glass-forming matter is deposited thereon, the said separating layer consisting substantially of refractory inorganic matter remaining loose and uncompacted after firing.

3. The method of claim 1, in which an engobe layer is deposited on said molding support, before the deposition of the batch destined to form the glass-like shape, said engobe layer being so chosen as to partly stick to said glass-like shape after firing, while detaching itself from said molding support.

4. The method of claim 1, in which a separating layer is deposited on the molding support and an engobe layer on said separating layer, before the batch destined to form the glass-like shape is deposited.

5. The method of claim 1, in which a separating layer is deposited on the surface of the molding support, before the batch of glass-forming matter is deposited thereon, the said separating layer consisting substantially of refractory matter selected from the group constituted by ground calcium oxide and magnesium oxide, and remaining loose and uncompacted after firing.

6. As a new article of manufacture, a thin plate-like shape formed with a front part consisting of a glass, this glassy front part gradually merging into an engobe layer and this engobe layer into a substantially uniformly rough underside consisting of a grained material, said engobe layer and said grained material being more refractory than said glass.

7. The article of claim 6 having the form of a curved plate.

8. The article of claim 6, in which the grained refractory material consists substantially of substances selected from the group constituted by calcium oxide and magnesium oxide.

9. The method of claim 1, in which a separating layer is deposited on the surface of the molding support, before the batch of glass-forming matter is deposited thereon, the said separating layer consisting substantially of refractory matter selected from the group constituted by ground quartz, aluminium hydrate or anhydride, and sillimanite, and remaining loose and uncompacted after firing.

10. The method of claim 1, in which a separating layer is deposited on the surface of the molding support, before the batch of glass-forming matter is deposited thereon, the said separating layer consisting substantially of ground zirconium sand and remaining loose and uncompacted after firing.

11. The article of claim 6, in which the grained refractory material consists substantially of substances selected from the group constituted by quartz, aluminium hydrate or anhydride and sillimanite.

12. The article of claim 6, in which the grained refractory material consists substantially of zirconium sand.

13. As a new article of manufacture, a thin plate-like shape comprising a front part consisting of a glass, a substantially uniformly rough underside consisting of a substantially continuous layer of a grained material more refractory than said glass, and an intermediate layer wherein said glassy front part gradually merges into said rough underside, said intermediate layer comprising grained material from said underside dissolved in glass of said front part, whereby to eliminate undue stresses between said front part and said underside.

14. The article of claim 13 having the form of a curved plate.

15. The article of claim 13, in which the grained material consists substantially of substances selected from the group constituted by calcium oxide and magnesium oxide.

16. The article of claim 13, when covered with a reinforcing protective layer.

17. As a new article of manufacture, a thin plate-like shape comprising a front part consisting of a glass, an engobe layer of grained material more refractory than said glass, an intermediate layer wherein said glassy front part gradually merges into said engobe layer, said intermediate layer comprising grained material from said engobe layer dissolved in glass of said front part, and a substantially uniformly rough underside consisting of a substantially continuous layer of grained material more refractory than said glass, said engobe layer gradually merging into said underside, whereby to eliminate undue stresses between said glassy front part, said engobe layer and said underside, respectively.

MAURIZIO KORACH.
ANTONINO DAL BORGO.